United States Patent
González Del Egido et al.

(10) Patent No.: US 8,904,738 B2
(45) Date of Patent: Dec. 9, 2014

(54) WIND TURBINE TOWER SUPPORTING STRUCTURE

(75) Inventors: Alberto González Del Egido, Barcelona (ES); Pere Viladomiu I Guarro, Barcelona (ES)

(73) Assignee: Alstom Renovables Espana, S.L., Barcelona (ES)

( * ) Notice: Subject to any disclaimer, the term of this patent is extended or adjusted under 35 U.S.C. 154(b) by 0 days.

(21) Appl. No.: 14/009,080

(22) PCT Filed: May 15, 2012

(86) PCT No.: PCT/EP2012/059008
§ 371 (c)(1),
(2), (4) Date: Sep. 30, 2013

(87) PCT Pub. No.: WO2012/156399
PCT Pub. Date: Nov. 22, 2012

(65) Prior Publication Data
US 2014/0020318 A1    Jan. 23, 2014

Related U.S. Application Data

(60) Provisional application No. 61/539,063, filed on Sep. 26, 2011.

(30) Foreign Application Priority Data

May 16, 2011  (EP) .................................... 11382151

(51) Int. Cl.
*E04C 3/00* (2006.01)
*E04H 12/22* (2006.01)
*E02D 27/42* (2006.01)
*E04H 12/08* (2006.01)
*F03D 11/04* (2006.01)

(52) U.S. Cl.
CPC ................. *E04H 12/22* (2013.01); *E02D 27/42* (2013.01); *E04H 12/08* (2013.01); *E04H 12/085* (2013.01); *F03D 11/04* (2013.01); *F05B 2240/40* (2013.01); *F05B 2240/912* (2013.01); *Y02E 10/728* (2013.01)
USPC ............................................ 52/848; 52/223.5

(58) Field of Classification Search
USPC .......... 52/831, 848, 849, 223.1, 223.3–223.5; 174/2, 3, 45 R; 285/288.1, 288.8
See application file for complete search history.

(56) References Cited

U.S. PATENT DOCUMENTS 2,439,266 A    4/1948  Settle
4,714,225 A *  12/1987  Skinner et al. ................. 248/523
(Continued)

FOREIGN PATENT DOCUMENTS

EP          2256338         12/2010
WO      WO00/46452    *   8/2000  .............. E02D 27/42
WO      WO 2004/101898   11/2004

OTHER PUBLICATIONS

International Search Report and Written Opinion for PCT/EP2012/059008, mailed Jun. 6, 2012, 9 pgs.

*Primary Examiner* — William Gilbert
*Assistant Examiner* — Gisele Ford
(74) *Attorney, Agent, or Firm* — Squire Patton Boggs (US) LLP

(57) ABSTRACT

It comprises at least one shell portion for forming a shell segment of a wind turbine tower and a flange portion attached to the shell portion. The flange portion comprises flange sectors separated from each other by corresponding spaces defining a discontinuous flange portion. The shell portion includes apertures formed in correspondence with the spaces between adjacent flange sectors. The flange sectors are formed with at least one base portion extending from at least one face of the shell portion at an angle to the shell portion. The base portion may have a varying thickness.

10 Claims, 3 Drawing Sheets

(56) References Cited

U.S. PATENT DOCUMENTS

| | | | |
|---|---|---|---|
| 5,333,436 A * | 8/1994 | Noble | 52/849 |
| 5,687,537 A * | 11/1997 | Noble | 52/849 |
| 7,343,718 B2 * | 3/2008 | Foust et al. | 52/745.17 |
| 7,360,340 B2 * | 4/2008 | Grundman et al. | 52/40 |
| 7,665,273 B2 * | 2/2010 | Fuellhaas et al. | 52/745.04 |
| 7,721,476 B2 * | 5/2010 | Tumlinson et al. | 40/607.05 |
| 7,849,659 B2 * | 12/2010 | Kopshever, Sr. | 52/745.17 |
| 8,196,358 B2 * | 6/2012 | Shiraishi | 52/40 |
| 8,209,913 B2 * | 7/2012 | Murata | 52/40 |
| 8,225,576 B2 * | 7/2012 | Kristensen | 52/741.14 |
| 8,250,833 B2 * | 8/2012 | Thomsen | 52/845 |
| 8,316,615 B2 * | 11/2012 | Haridasu et al. | 52/745.17 |
| 8,322,757 B2 * | 12/2012 | Ma | 285/416 |
| 8,381,487 B2 * | 2/2013 | Gomez et al. | 52/745.18 |
| 8,402,718 B2 * | 3/2013 | Stiesdal | 52/845 |
| 8,590,276 B2 * | 11/2013 | Kryger et al. | 52/845 |
| 2004/0006941 A1 * | 1/2004 | Brinker | 52/309.4 |
| 2006/0150572 A1 * | 7/2006 | Rawson-Harris | 52/736.2 |
| 2006/0228218 A1 * | 10/2006 | Cone | 416/244 A |
| 2006/0236648 A1 * | 10/2006 | Grundman et al. | 52/726.4 |
| 2010/0024311 A1 | 2/2010 | Wambeke et al. | |
| 2010/0319276 A1 * | 12/2010 | Kryger et al. | 52/173.1 |
| 2011/0023411 A1 * | 2/2011 | Grossman et al. | 52/848 |
| 2011/0154777 A1 * | 6/2011 | Bagepalli | 52/849 |
| 2011/0239586 A1 * | 10/2011 | Stiesdal | 52/854 |

* cited by examiner

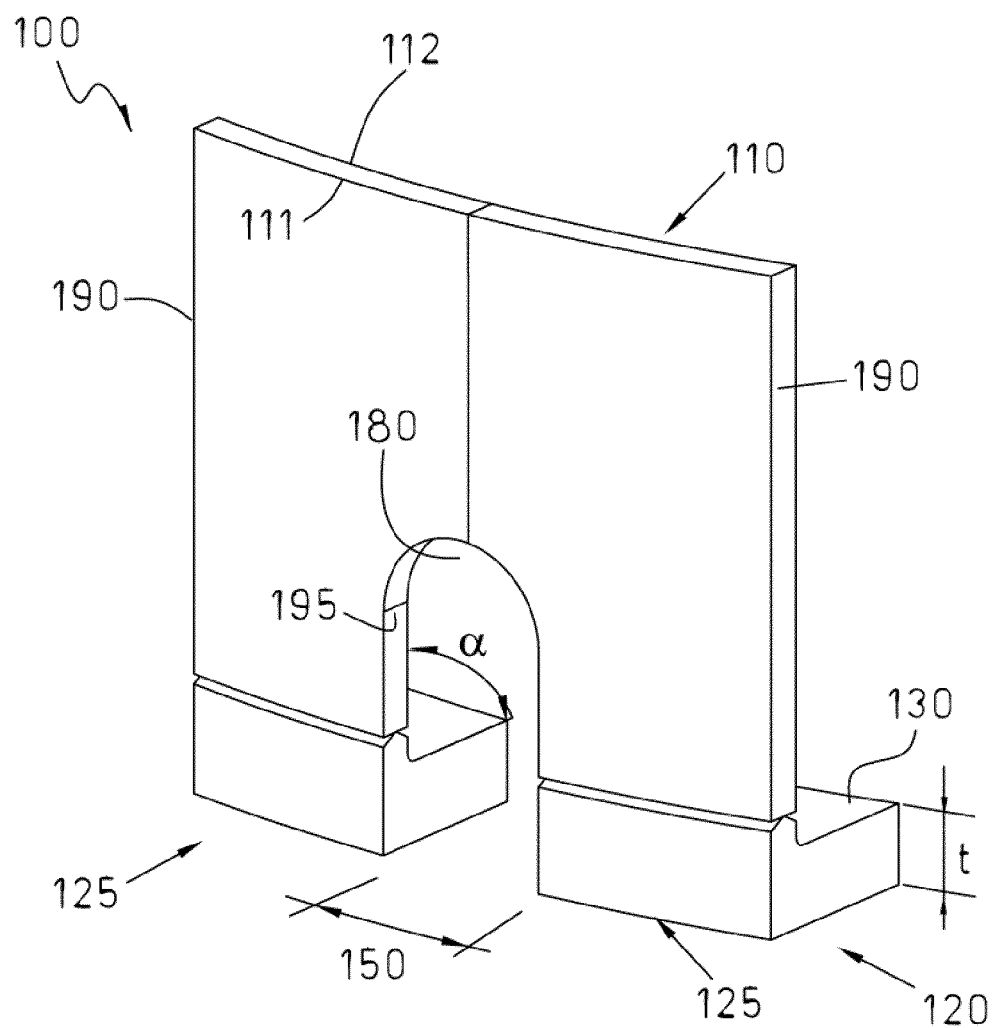

WIND TURBINE TOWER SUPPORTING STRUCTURE

TECHNICAL FIELD

Supporting structures for wind turbine towers.

BACKGROUND

The foundation of a wind turbine tower, either it is of the onshore or the offshore type, must have sufficient strength to withstand extreme loads with a suitable margin of safety. This is especially relevant when the tower is very high and blades are required to be considerably long, especially when high power is to be generated by the wind turbine.

In this respect, the foundation of a wind turbine tower must be also designed to withstand fatigue damage due to operational loads and to certain conditions such as nacelle yawing, start-ups and shutdowns, etc.

For this purpose, the dimensions of the foundation upon which the wind turbine is supported are increased according to the requirements. Increased dimensions result in a number of disadvantages. These disadvantages are related, for example, to increased manufacturing and transportation costs.

Document WO2004101898A2 provides a circular foundation formed of a number of parts, namely a central hollow-cylindrical base and a plurality of radially extending foot modules. The foot modules can be transported separately to the site where the wind turbine is to be erected. However, the cylindrical base of the foundation is made of a single piece and it is very large such that transportation of wind turbine parts in this case remains a complex operation and costs remain undesirably increased.

U.S. 2010024311 discloses a wind turbine tower having a tubular tower mount made of a continuous piece for supporting the tower one end of which can be connected to the tower and the other end being mountable on a foundation. The tower mount cross-section is greater than its height and includes a plurality of circumferential segments that are connectable to each other to form the tubular tower mount. In this case, the provision of a tower mount made of a continuous piece allows stress concentration in the joining areas of the circumferential segments.

SUMMARY

A solution is herein disclosed for building foundations in wind turbine towers as well as for connecting different levels of tower sections to each other in order to form a wind turbine tower. The disclosed tower supporting structure overcomes the prior art disadvantages related mainly to transportation and manufacturing of wind turbine towers. The disclosed tower supporting structure further improves tower fatigue and strength of the tower assembly.

As stated above, although the disclosure is primarily directed to wind turbine tower foundations, it has been found that it can be advantageously used for flange connections for making different levels of tower sections connected to each other in order to form a wind turbine tower.

A wind turbine tower supporting structure, as disclosed herein, comprises at least one shell portion for forming a shell segment.

As used herein, "shell portion" refers to a side wall unit of a wind turbine tower. "Shell segment" refers to one or a number of shell portions coupled to each other to form one level of a wind turbine tower. A shell segment can be made of a single shell portion. This is construction is particularly suitable for foundation embedded sections for connecting one end of the tower with the foundation. For other applications such that for connecting different levels of tower sections to each other, it is preferred that a shell segment is made of a number of shell portions. By arranging one or a series of shell segments (one above the other) a complete wind turbine tower is built.

The supporting structure herein disclosed further includes a flange portion. It is preferred that the flange portion is attached to the respective shell portion, that is, the flange portion is a separate piece. However, in some cases the flange portion could be integrally formed with the shell portion. This can be applied to one of the flange portions, to a number of the flange portions or even to all of the flange portions in one or more shell portions.

The flange portion of the wind turbine tower supporting structure herein disclosed comprises a number of flange sectors. In one embodiment of the supporting structure, at least two of the flange sectors are equal in shape and size to each other. The flange sectors are arranged separated from each other by corresponding spaces defining a discontinuous flange portion. The spacing between flange sectors can be the same or different as required.

The supporting structure for the wind turbine is thus formed of a number of pieces whose dimensions are small enough such that they are suitable for being easily transported by conventional means. The provision of several shell portions having flange portions with different flange sectors results in space being significantly saved for ease of transportation of the flange portion. A large foundation can be thus transported to the site where the tower of a wind turbine is to be erected, or where it is to be assembled, without having to make use of expensive and complex transportation means. Tower sections made of a number of shell segments connected to each other can be efficiently built up without the use of excessively large pieces. The various shell portions and flange portions with their different flange sectors can be transported at the same time for example by using conventional trucks or the like.

In addition, the fact the flange is divided into smaller sections allows the use of more efficient manufacturing process for example by forging and machining, slab bending, welding and machining, steel plate cutting and machining. Other suitable processes are weldable steel cast, open-die forging, etc.

In addition, since tower pieces are smaller, the manufacturing process is very simple as compared to those for large pieces (of the order of 4-5 m in diameter for prior art tower sections).

The shell portion of the present supporting structure includes a number of apertures. The apertures are formed in correspondence with the spaces arranged between adjacent flange sectors of the supporting structure.

The provision of such apertures results in that stress concentrations are advantageously avoided and forces are transmitted through the shell portions. A further advantage derived from the provision of such apertures is that welding, between shell and flange portions, is a more cost effective operation due to welding material cost savings.

The apertures may be parabolic, circular, elliptic, hyperbolic or combinations thereof, for example in order to improve the stress distribution around this area. Other shapes are also possible. In general, those shapes providing lower stress concentrations for the shell portion are preferred. In some embodiments of the supporting structure, at least two of the shell portion apertures in the same or different shell portions are equal in shape and size to each other.

In one embodiment of the supporting structure, the flange sectors are formed with at least one base portion extending from at least one face of the shell portion and at an angle to the shell portion. When the present supporting structure is for foundation embedded sections, the base portion extends from the two faces of the shell portion such that the flange portion is substantially T shaped. When the present supporting structure is for connecting means for connecting different levels of tower sections to each other in order to form a wind turbine tower, the base portion extends only from one face of the shell portion such that the flange portion is substantially L.

According to the most preferred embodiment of the flange portion of the supporting structure, the base portion will usually extend at right angles to the shell portion which in general will involve that the base portion is arranged horizontally, whether it is a T or L shaped flange portion.

It is also provided that the thickness of the flange sectors is different along their respective cross-sections. For example, the thickness of the flange sectors could be thicker at one of its edges near the aperture formed in the shell portion than at an opposite edge thereof. This allows free edge effects to be reduced at the spaces between flange sectors. An edge effect occurs when flange sectors tend to bend downwards due to loads close to the edge of the flange sector.

In the preferred embodiment of the supporting structure in which the shell portion and the flange portion are separate parts, the shell portion and the flange portion are attached to each other through a welded joint. The provision of the welded joint between said two parts of the supporting structure enable significant savings in welding material since welding is only needed for a smaller joining area in the interface of the shell portion and the flange portion.

It is also preferred that this welded joint is shaped such that it tapers towards the shell portion. This is important for ease of the welding operations.

It is to be also noted that starting and end points are critical in welded joint. Defects can be generated resulting in undesirable low fatigue strength points. It is therefore desirable to prevent solder blobs from appear at such starting and end points of the welded joint with the purpose of avoiding low fatigue strength areas. This can be simply carried out by making the welded joint larger by extending away a little bit more towards the apertures in the shell portion. Once the structure is welded, the welded fillet is cut such that defects are avoided.

It is also preferred that flange thickness is increased by smooth thickness transition to minimize the stress concentration at thickness transition area.

A shell segment for a wind turbine tower is also disclosed. The shell segment comprises at least one of the previously defined shell portions to form the tower.

Additional objects, advantages and features of embodiments of the supporting structure disclosed herein will become apparent to those skilled in the art upon examination of the description, or may be learned by practice of the present disclosure.

BRIEF DESCRIPTION OF THE DRAWINGS

Particular embodiments of the present disclosure will be described in the following by way of non-limiting examples, with reference to the appended drawings, in which:

FIG. 1*b* is a general perspective view of a second embodiment of a supporting structure for a wind turbine tower that is particularly intended for connecting different levels of tower sections in a wind turbine tower;

DETAILED DESCRIPTION OF EMBODIMENTS

Figure 1A:
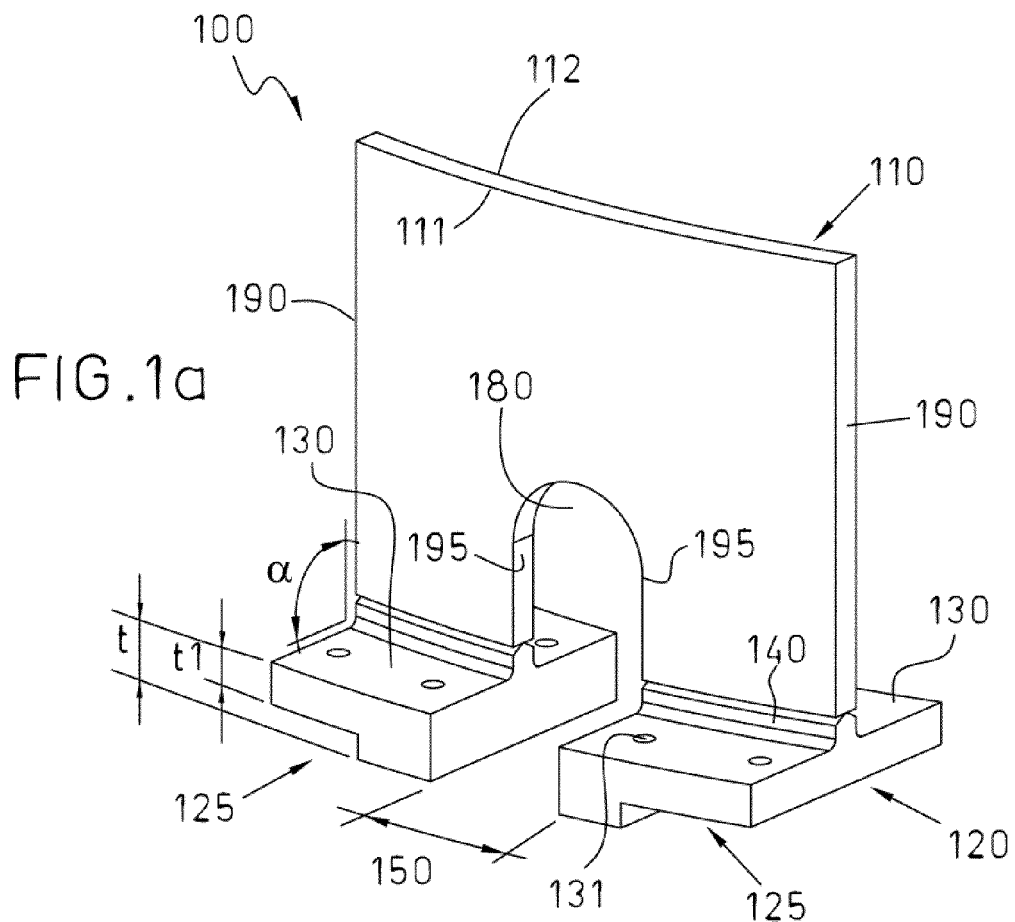
FIG. 1*a* is a general perspective view of a first embodiment of a supporting structure for a wind turbine tower that is particularly intended for foundation embedded sections.

The FIGS. 1*a*, 1*b*, 2 and 3 illustrate possible embodiments of the disclosed supporting structure for a tower of a wind turbine.

The two examples shown in the figures refer to two particular applications of the supporting structure: as foundation embedded sections for wind turbine towers and as connecting means for different levels of wind turbine tower sections. Both applications are not mutually exclusive and they can be used in both applications both in the same or different wind turbine towers.

Like reference numerals refer to like parts throughout the figures.

Figure 2:
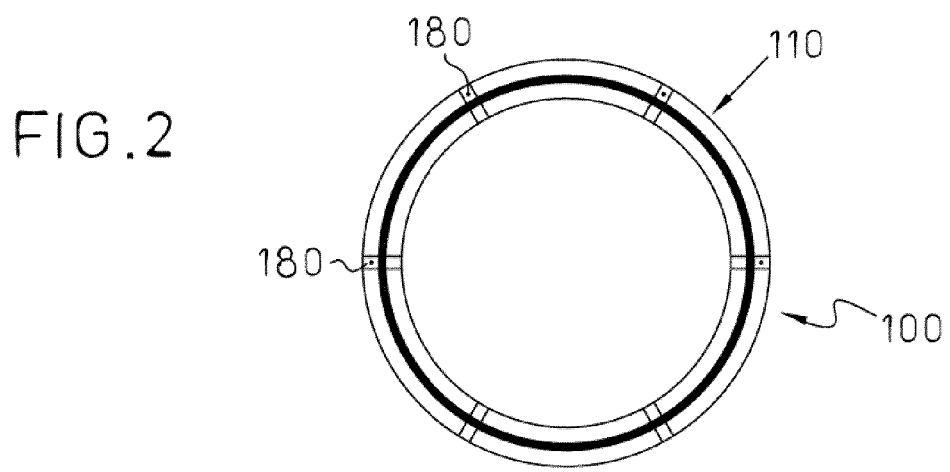
FIG. 2 is a top plan view of a shell segment of a wind turbine tower formed by a number of supporting structures as the one shown in FIG. 1*a*.
Figure 3:
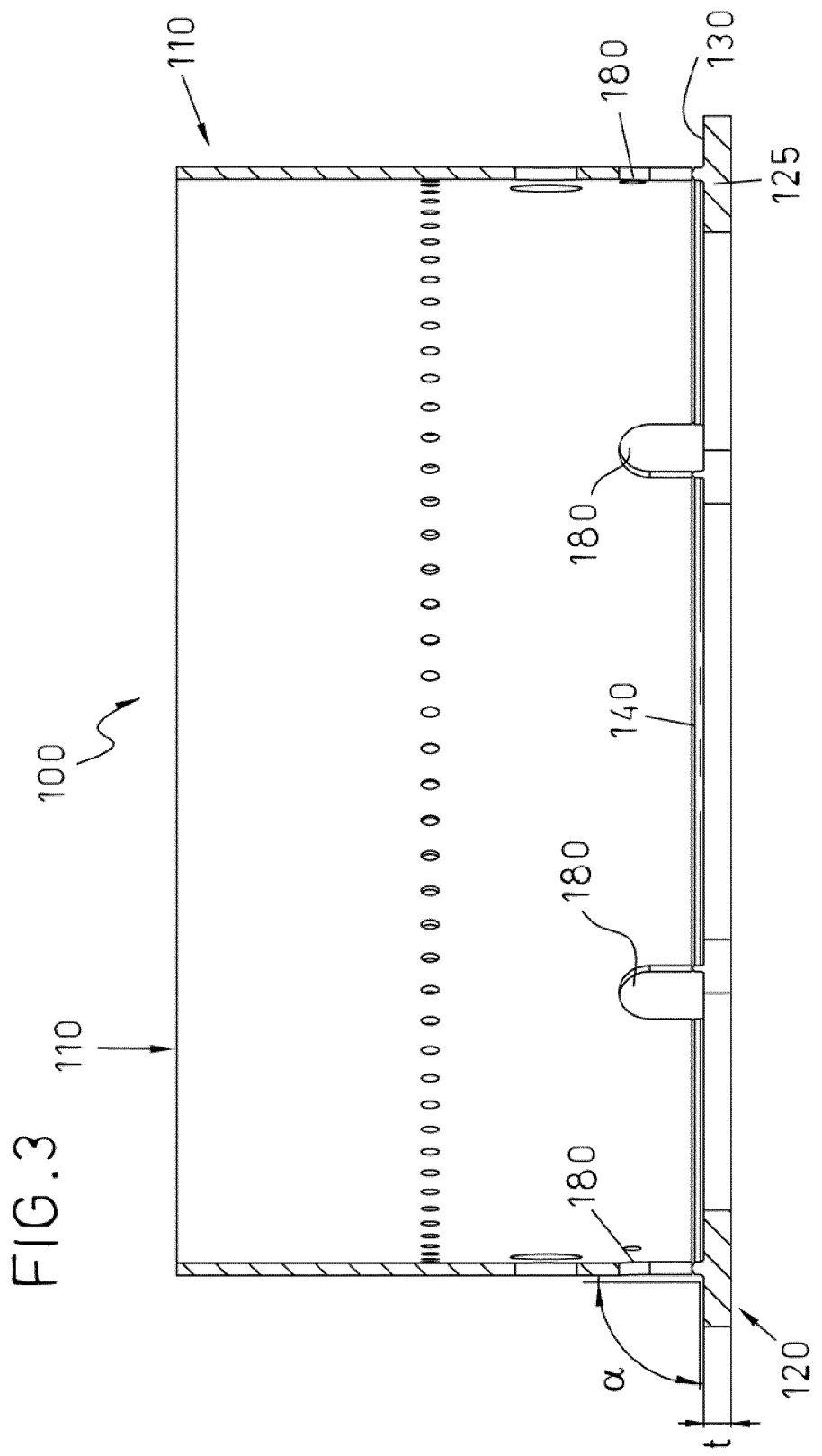
FIG. 3 is an elevational view of the shell segment in FIG. 2 corresponding to one level of a wind turbine tower.

Referring to FIGS. 1*a*, 2 and 3 of the exemplary embodiments, a supporting structure has been generally indicated at 100 in the drawings. This structure 100 is intended for foundation embedded sections for wind turbine towers and comprises a single cylindrical shell portion 110 as shown in FIG. 2 of the drawings, one part of which is shown in FIG. 1*a*. In this example, the supporting structure 100 is of about 2 m high suitable for connecting one end of the tower with the foundation.

The particular embodiment of the supporting structure 100 shown in FIGS. 1*a*, 2 and 3 includes a single flange portion 120 in correspondence with the single cylindrical shell portion 110. The flange portion 120 can be a separate part or it may be attached to the shell portion 110. The preferred embodiment of flange portion 120 attached to shell portion 110 is herein described.

The flange portion 120 of the supporting structure 100 comprises a number of flange sectors 125 provided at the edges 190 thereof. The flange sectors 125 can be provided with a number of holes 131 for receiving anchoring bolts.

In the embodiment shown in the drawings, the flange portion 120 is provided at a lower edge of the shell portion 110 although other locations are possible. Other locations for the flange sectors 125 are of course possible along the flange portion 120 too.

The flange sectors 125 are separated from each other by corresponding spaces 150. Spaces 150 thus define a discontinuous flange portion 120. In the embodiment shown in FIGS. 1*a*, 2 and 3 the spaces 150 are arranged at a substantially central portion of the supporting structure 100. The length of the spaces 150 may be varied as required depending upon the characteristics of the supporting structure 100. The flange sectors 125 can be equal to each other. In one example, at least two of the flange sectors 125 can be equal in shape and size to each other in the same flange portion 120.

As shown in the figures, the shell portion 110 includes a number of apertures 180. Apertures 180 may be also formed at a central portion of the shell portion 110 as shown in FIG. 1*a*. Other locations for the apertures 180 are not ruled out. It is therefore preferred that apertures 180 are formed in correspondence with the spaces 150 so that a general aperture 150-180 is defined in the supporting structure 100.

Apertures 180 in the shell portion 110 are preferably elliptic in shape. However other shapes corresponding to a conic section in general are also possible, such as parabolic, circular, elliptic, hyperbolic or combinations thereof, for example. In general, shapes providing lower stress concentration for the shell portion 110 are preferred. Apertures 180 of different shell portions 110 may be equal to each other. For example, at least two shell portion apertures 180 may be equal in shape and size to each other.

As shown in FIG. 1a of the drawings, the lower portion of the flange sectors 120 of the supporting structure 100 extends into a base portion 130. In the embodiment shown in FIG. 1a, the base portion 130 is substantially horizontal, that is, substantially perpendicular to the shell portion 110. However, an angle α between the base portion 130 and the shell portion 110 can be defined different from 90° if required.

Note that in this embodiment of the supporting structure 100 according to FIGS. 1a, 2 and 3, that is intended for foundation embedded sections, the base portion 130 extends from the two faces 111, 112 of the shell portion 110 such that the flange portion 120 is substantially T shaped. This however does not rule out embodiments in which different constructions for the flange portion 120 are also possible for this particular application. However the T shaped construction of the flange portion 120 is herein preferred as it allows transfer tower loads to the concrete foundation structure for an embedded steel sector embodiment.

In some embodiments of this supporting structure 100, the thickness t of the flange sectors 125 may be constant through the cross-section of the flange sectors 125. In others, the thickness t of the flange sectors 125 may be different through the cross-section of the flange sectors 125. In one example, one or more of the flange sectors 125 can exhibit a first thickness t in one portion near an inner edge 195 (that corresponding to shell portion aperture 180) of the supporting structure 100 and a second thickness t1 in one opposite portion, near an outer edge 190 of the shell portion 110. In this case, the first thickness t can be thicker than the second thickness t1 for the purpose of reducing a free edge effect at the apertures 180.

In the disclosed embodiment of the supporting structure 100, the shell portion 110 and the flange portion 120 are attached to each other through a welded joint 140. Due to the presence of the general aperture 150-180 defined in the supporting structure 100, welding material is reduced due to a smaller joining area in the interface of such shell and flange portions 110, 120.

Reference is now made to the second embodiment shown FIGS. 1b and 2 of the drawings corresponding to a structure 100 intended for connecting different levels of wind turbine tower sections.

The supporting structure 100 according to the embodiment in FIG. 2 comprises six mutually connected shell portions 110. FIG. 1b shows in detail one of such shell portions 110 of the supporting structure 100.

The shell portion 110 is designed such that it can be coupled to an adjacent shell portion 110 to form a shell segment as mentioned. A number of shell segments, arranged one above the other, forms a wind turbine tower.

The particular embodiment of the supporting structure 100 shown in FIG. 1b includes a flange portion 120. This flange portion 120 may be a separate part or it may be attached to a corresponding shell portion 110. Other embodiments in which a single piece flange-shell portion is provided are not ruled out. The preferred embodiment of flange portion 120 attached to shell portion 110 is herein described.

The flange portion 120 of the supporting structure 100 comprises a number of flange sectors 125 provided with a number of holes 131 for receiving connecting bolts. In the embodiment shown in the drawings, each flange portion 120 is provided at a lower edge of the shell portion 110 although other locations are possible. Each flange portion 120 comprises two flange sectors 125 that are provided at opposite edges 190 thereof. Other locations for the flange sectors 125 are of course possible along the flange portion 120.

The flange sectors 125 in the flange portions 120 are separated from each other by corresponding spaces 150. Spaces 150 thus define a discontinuous flange portion 120. In the embodiment shown in the drawings in which the flange sectors 125 are provided in correspondence with opposite edges 190 of the respective flange portions 120, the spaces 150 are arranged at a substantially central portion of the supporting structure 100 as shown in FIG. 1b. The length of the spaces 150 may be varied as required depending upon the characteristics of the supporting structure 100. The flange sectors 125 can be equal to each other. In one example, at least two of the flange sectors 125 can be equal in shape and size to each other in the same flange portion 120.

As shown in the figures, the shell portion 110 includes a number of apertures 180. Apertures 180 may be also formed at a central portion of the shell portion 110 as shown in FIG. 1b. Other locations for the apertures 180 are not ruled out. It is therefore preferred that apertures 180 are formed in correspondence with the spaces 150 between adjacent flange sectors 125 so that a general aperture 150-180 is defined in the supporting structure 100.

In this embodiment of the supporting structure 100 according to FIG. 1b, intended for connecting different levels of tower sections to each other in order to form a wind turbine tower, the base portion 130 extends from only one face 112 of the shell portion 110 such that the flange portion 120 is substantially L shaped. This however does not rule out embodiments in which different constructions for the flange portion 120 are also possible for this particular application.

Also in this embodiment, apertures 180 in shell portion 110 are preferably elliptic in shape. However other shapes corresponding to a conic section in general are also possible, such as parabolic, circular, elliptic, hyperbolic or combinations thereof, for example. In general, shapes providing lower stress concentration for the shell portion 110 are preferred.

Apertures 180 of different shell portions 110 may be equal to each other. For example, at least two shell portion apertures 180 may be equal in shape and size to each other.

As shown in FIG. 1b of the drawings, the lower portion of the flange sectors 120 of the supporting structure 100 extends into a base portion 130. In the embodiment shown in FIG. 1b, the base portion 130 is substantially horizontal, that is, substantially perpendicular to the shell portion 110. However, an angle α between the base portion 130 and the shell portion 110 can be defined different from 90° if required.

As in the above T shaped flange portion embodiment, in this L shaped flange portion embodiment the thickness of the flange sectors 125 may be constant through the cross-section of the flange sectors 125 or varying through the cross-section of the flange sectors 125 for reducing a free edge effect at the apertures 180. In the embodiment shown in FIG. 1b, the thickness of the flange sectors 125 is constant through the cross-section of the flange sectors 125.

In the disclosed embodiment of the supporting structure 100 in FIG. 1b, the shell portion 110 and the flange portion 120 are attached to each other through a welded joint 140. Due to the presence of the general aperture 150-180 defined in the supporting structure 100, welding material is reduced due to a smaller joining area in the interface of such shell and flange portions 110, 120.

Although only a number of particular embodiments and examples of the disclosure have been disclosed herein, it will be understood by those skilled in the art that other alternative embodiments and/or uses and obvious modifications and equivalents thereof are possible. Furthermore, the present disclosure covers all possible combinations of the particular embodiments described. Thus, its should not be limited by particular embodiments, but should be determined only by a fair reading of the claims that follow.

The invention claimed is:

1. A wind turbine tower supporting structure, the supporting structure comprising:
   at least one shell portion that forms a side wall of a shell segment of a wind turbine tower, wherein the shell segment is configured for connecting a wind turbine foundation with another shell segment or for connecting different shell segments to each other,
   a flange portion attached to the shell portion, wherein the flange portion comprises a number of flange sectors that are separated from each other by corresponding spaces defining a discontinuous flange portion,
   the shell portion including a number of apertures formed in the side wall, wherein an aperture is located above each of the spaces between adjacent flange sectors, and
   wherein the flange sectors are formed with at least one base portion extending from at least one face of the side wall at an angle $\alpha$.

2. The supporting structure of claim 1, wherein the base portion extending at the angle to the side wall has a varying thickness.

3. The supporting structure of claim 2, wherein the thickness of the base portion is greater at one of its edges near an aperture formed in the side wall than a thickness at an opposite edge thereof.

4. The supporting structure of claim 1, wherein the angle formed by the base and the face of the side wall is 90°.

5. The supporting structure of claim 1, wherein at least two flange sectors are equal in shape and size to each other.

6. The supporting structure of claim 1, wherein at least two shell portion apertures are equal in shape and size to each other.

7. The supporting structure of claim 1, wherein a profile of at least some of the shell portion apertures is a conic section in shape.

8. The supporting structure of claim 1, wherein the shell portion and the flange portion are attached to each other through a welded joint.

9. The supporting structure of claim 8, wherein the welded joint is shaped such that it tapers towards the shell portion.

10. A shell segment configured for connecting a wind turbine foundation with another shell segment or for connecting different shell segments to each other, the shell segment comprising:
    a plurality of shell portions each including a side wall of the shell segment, the shell portions each having a top edge, bottom edge, and vertically extending edges and being mutually interconnected at their vertically extending edges, and
    each of the shell portions further comprising:
      a flange portion attached to the shell portion along the bottom edge thereof, the flange portion comprising a number of flange sectors separated from each other by corresponding spaces defining a discontinuous flange portion, and the flange sectors being formed with at least one base portion extending from at least one face of the side wall, and
      a number of apertures formed in the side wall and located above each of the spaces between adjacent flange sectors.

* * * * *